United States Patent
Josefsberg et al.

(10) Patent No.: US 7,930,427 B2
(45) Date of Patent: Apr. 19, 2011

(54) CLIENT-SIDE LOAD BALANCING

(75) Inventors: Arne Josefsberg, Medina, WA (US);
John D Dunagan, Bellevue, WA (US);
Mark D. Scheibel, Kirkland, WA (US);
Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 12/041,600

(22) Filed: Mar. 3, 2008

(65) Prior Publication Data
US 2009/0222583 A1 Sep. 3, 2009

(51) Int. Cl.
*G06F 13/00* (2006.01)
(52) U.S. Cl. .................. 709/245; 709/226; 718/105
(58) Field of Classification Search .......... 709/245, 709/226, 217–219; 718/105, 104, 102
See application file for complete search history.

(56) References Cited

U.S. PATENT DOCUMENTS

| | | | |
|---|---|---|---|
| 6,128,279 A * | 10/2000 | O'Neil et al. ............... 370/229 |
| 6,351,775 B1 | 2/2002 | Yu |
| 6,446,121 B1 | 9/2002 | Shah et al. |
| 6,606,643 B1 | 8/2003 | Emens et al. |
| 6,625,319 B1 | 9/2003 | Krishnamachari |
| 6,785,704 B1 | 8/2004 | McCanne |
| 6,981,055 B1 | 12/2005 | Ahuja et al. |
| 7,003,555 B1 | 2/2006 | Jungck |
| 7,062,562 B1 | 6/2006 | Baker et al. |
| 7,111,061 B2 | 9/2006 | Leighton et al. |
| 7,136,932 B1 * | 11/2006 | Schneider .................. 709/245 |
| 7,152,118 B2 | 12/2006 | Anderson, IV et al. |
| 7,171,415 B2 | 1/2007 | Kan et al. |
| 7,194,552 B1 | 3/2007 | Schneider |
| 7,228,359 B1 | 6/2007 | Monteiro |
| 7,284,051 B1 | 10/2007 | Okano et al. |
| 7,519,690 B1 | 4/2009 | Barrow et al. |
| 7,574,508 B1 | 8/2009 | Kommula |
| 7,584,301 B1 | 9/2009 | Joshi |
| 7,685,422 B2 | 3/2010 | Isozaki et al. |
| 7,707,314 B2 * | 4/2010 | McCarthy et al. ............ 709/245 |
| 7,710,984 B2 * | 5/2010 | Dunk ........................ 370/400 |
| 2002/0038360 A1 | 3/2002 | Andrews et al. |
| 2003/0069968 A1 * | 4/2003 | O'Neil et al. ................ 709/225 |
| 2003/0229697 A1 | 12/2003 | Borella |
| 2004/0039798 A1 | 2/2004 | Hotz et al. |
| 2004/0073640 A1 | 4/2004 | Martin et al. |
| 2004/0264465 A1 * | 12/2004 | Dunk ........................ 370/392 |
| 2005/0265317 A1 * | 12/2005 | Reeves et al. ............... 370/352 |
| 2006/0075139 A1 | 4/2006 | Jungck |
| 2006/0129675 A1 * | 6/2006 | Zimmer et al. .............. 709/225 |

(Continued)

OTHER PUBLICATIONS

Wikipedia, "Operating System", retrieved from Wikipedia website on Oct. 8, 2010; pp. 1-17.*

(Continued)

*Primary Examiner* — Kenneth R Coulter
(74) *Attorney, Agent, or Firm* — Lee & Hayes, PLLC (57) ABSTRACT

An exemplary method for load balancing includes accessing a range of values for IP addresses associated with a virtual IP address associated with a domain name; selecting, using a local statistical algorithm, a value in the range; and, based at least in part on the selected value, connecting to a remote resource at one of the IP addresses. In such a method, a client can perform local load balancing when connecting to one of many fungible resources "behind" a virtual IP address. With many such clients, the task of load balancing is distributed as opposed to being centralized at a server farm or cluster. Other methods, devices and systems are also disclosed.

20 Claims, 11 Drawing Sheets

U.S. PATENT DOCUMENTS

| | | |
|---|---|---|
| 2006/0143442 A1 | 6/2006 | Smith |
| 2006/0190602 A1 | 8/2006 | Canali et al. |
| 2006/0200539 A1 | 9/2006 | Kappler et al. |
| 2006/0224773 A1 | 10/2006 | Degenaro et al. |
| 2007/0016663 A1 | 1/2007 | Weis |
| 2007/0041393 A1 | 2/2007 | Westhead et al. |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1* | 5/2007 | McCarthy et al. ............ 709/238 |
| 2008/0016233 A1 | 1/2008 | Schneider |
| 2008/0086574 A1 | 4/2008 | Raciborski et al. |
| 2008/0235383 A1 | 9/2008 | Schneider |
| 2009/0019181 A1 | 1/2009 | Fang et al. |
| 2010/0010991 A1 | 1/2010 | Joshi |

OTHER PUBLICATIONS

Global Server Load Balancing for Disaster Recovery, Business Continuity, Performance Optimization and Datacenter Management; Zeus Technology Limited; pp. 4; 2007.*

Domain Name System (DNS), retrieved on Apr. 29, 2008 at <<http://www.unix.org.ua/orelly/networking/firewall/ch08_10.htm>>, Unix, pp. 1-11.

Domain Name System (DNS) A Guide to TCP/IP, retrieved at <<http://web.syr.edu/~djmolta/ist452/ch_07.ppt>>, Thomson Learning Course Technology, pp. 1-56 ; 2007.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16 ; 2004.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

"Flow Control Platform (FCP) Solutions", at <<http://k2colocation.com/network-services/fcp.cfm>>, K2 Colocation 2005, pp. 2.

Linden, "The End of Federated Search?", at <<http://glinden.blogspot.com/2007/03/end-of-federated-search.html>>, Mar. 24, 2007, pp. 9.

* cited by examiner

CLIENT-SIDE LOAD BALANCING

BACKGROUND

To meet client demands, computing environments should be scalable, available and manageable. Technologies referred to generally as "clustering" aim to address such concerns. A "cluster" may be defined as a group of independent computers that work together to run a common set of applications and that provide an image of a single system to a client and application. More generally, a cluster may be defined as a set of resources, made available to users and presented as a unified entity to the users.

While client users may not be aware that a cluster exists, they expect server-based resources (e.g., applications and data) to be readily available. With respect to availability, when a component or an application in a cluster fails, cluster software should respond, for example, by restarting the failed application or dispersing work from the failed component to another component in the cluster. Clustering technologies often provide a graphical console with tools, for example, to facilitate moving applications and data within the cluster to different servers. Such a clustering feature can be used, for example, to manually balance workloads and to unload servers for planned maintenance without downtime.

A clustering technology known as network load balancing (NLB) includes aspects of scalability, availability and manageability. NLB can be implemented in hardware (e.g., a dedicated NLB machine) or software (e.g., executing on hardware). NLB provides for strategic distribution of client requests or TCP/IP traffic to appropriate resources in a cluster. Some commercially available clustering technologies provide for NLB in a cluster of around 30 host servers. Some NLB techniques present a common "virtual" IP address for an entire cluster and transparently partition client requests across the multiple servers in the cluster.

One commonly used software NLB technique distributes incoming client requests for TCP and Universal Datagram Protocol (UDP) protocols, including HTTP, across multiple members of a cluster. In such a system, NLB software resides on each member of the cluster. Periodically, each member transmits an NLB exchange message over its network adapters. This message is used to coordinate actions between each member. By default, the period of message exchange is 1 second. As the state of the cluster changes (for example, by adding or removing members or setting members offline or online), the message exchanges for NLB are disrupted. After a certain number of failed message exchanges, NLB initiates a process to determine the current state of the cluster so that it can load balance the cluster properly. By default, NLB initiates this process after five failed message exchanges. NLB automatically redistributes requests among the active, remaining members. This redistribution ensures that non-active members do not receive any requests, and requests are only processed by active members.

In the foregoing software NLB example, each member in a cluster receives all incoming requests. This technique uses a fully distributed algorithm to determine which member processes the request; all other members discard the request. This method of load balancing may be more efficient than using traditional load balancing devices (i.e., hardware NLB), because filtering unwanted requests is faster than routing them. However, the overall scalability of the software load balancing may still be unsatisfactory because all members receive all requests.

With respect to hardware NLB, a conventional implementation typically includes a master and a slave that may serve over 100 servers hidden behind a virtual IP address where each server has a "real" IP address. These devices can become bottlenecks under some circumstances, which, in turn, can adversely impact user experience. Hardware NLB can be expensive and, at times, unreliable.

In the aforementioned existing techniques for NLB, clients are essentially blind participants. As described herein, various exemplary techniques allow for client-side load balancing.

SUMMARY

An exemplary method for load balancing includes accessing a range of values for IP addresses associated with a virtual IP address associated with a domain name; selecting, using a local statistical algorithm, a value in the range; and, based at least in part on the selected value, connecting to a remote resource at one of the IP addresses. In such a method, a client can perform local load balancing when connecting to one of many fungible resources "behind" a virtual IP address. With many such clients, the task of load balancing is distributed as opposed to being centralized at a server farm or cluster. Other methods, devices and systems are also disclosed.

DESCRIPTION OF DRAWINGS

Non-limiting and non-exhaustive examples are described with reference to the following figures.

DETAILED DESCRIPTION

Various exemplary methods, devices, system, etc., described herein pertain to client-side load balancing in a Domain Name System (DNS). Various techniques distribute load balancing amongst clients as opposed to conventional techniques that load balance centrally at a server farm or cluster.

Various exemplary techniques include receiving range information about real IP addresses in a cluster (e.g., server farm) behind a virtual IP address. For example, a client receives a virtual IP address and a range of values associated with a server cluster, in turn, the client selects a value from the range of values and uses the value in connecting to a specific server in the cluster. The selection process may be statistically based, for example, the client may randomly select a value in the range of values. With many similarly configured clients, the statistical selection process effectuates load balancing for a group of fungible resources (e.g., a group of host servers for a domain name).

In various examples, a Domain Name System server (DNS server) receives a range from a cluster (e.g., with an associated virtual IP address) and then transmits at least the range to the client (e.g., in a Resource Record) where the client may store the information to a client resolver cache (e.g., client-side DNS cache). In turn, the client can perform a selection process using the range information where the selection process acts to load balance the resources that make up the cluster. In various examples, transmission of range information can occur via DNS and TXT records; via "Extensions to DNS" (EDNS) and explicit new record types; or entirely outside DNS but applied to select an address returned by a DNS query.

While various examples refer to a virtual IP address, a non-enhanced client typically does not know whether a given IP address is or is not a virtual IP address, as load balancing associated with a virtual IP address takes place remote from the non-enhanced client (e.g., by a load balancer at a datacenter). Various exemplary techniques described herein may be used without a virtual IP address. For example, where a network includes only enhanced clients, range information is sufficient for purposes of connecting a client to a remote resource. In such an example, a virtual IP address is not required as, in response to a client's request to resolve a domain name, a DNS server may simply transmit range information to the client. In turn, the client selects an IP address based at least in part on the range information.

Figure 1:
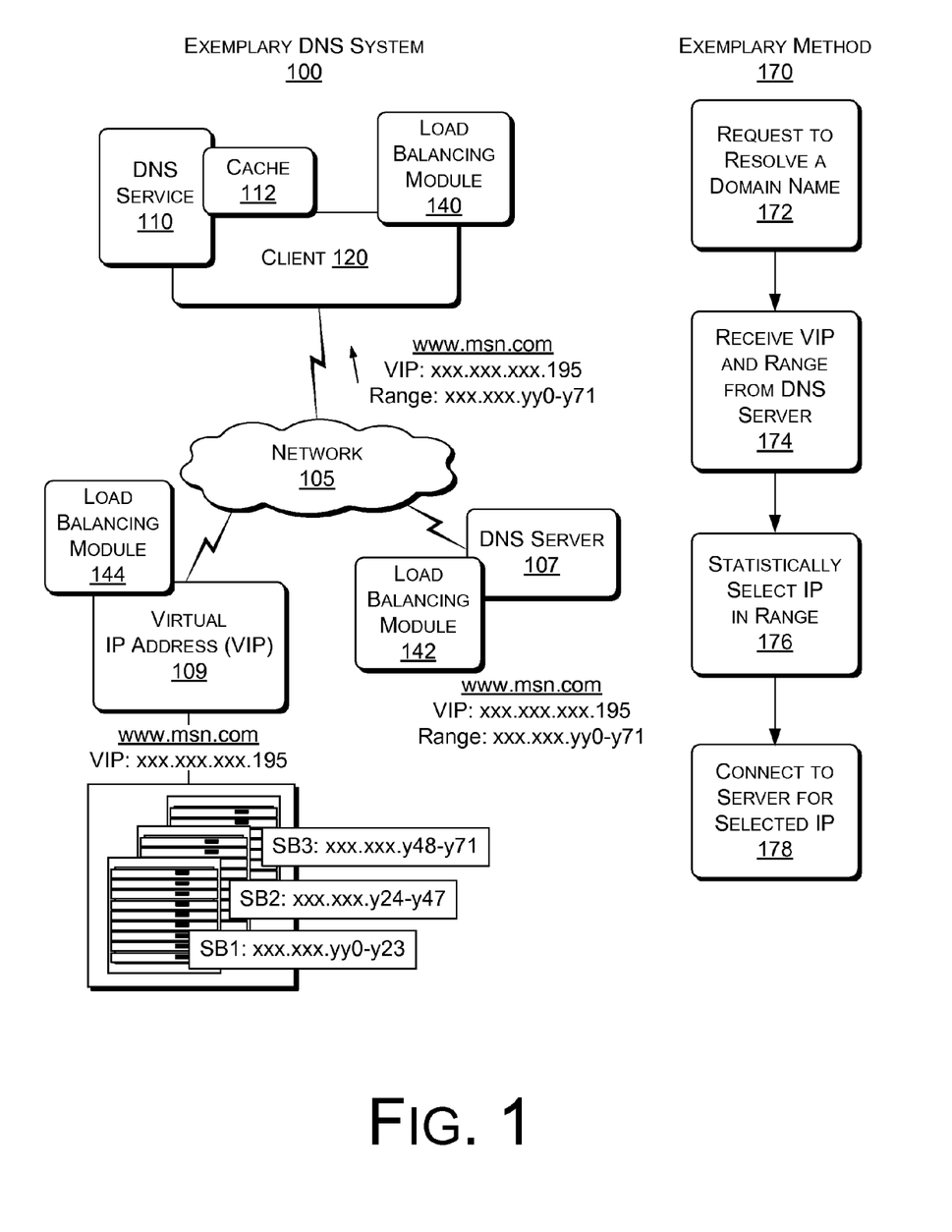
FIG. 1 is a diagram of an exemplary DNS system and method for client-side load balancing.

FIG. 1 shows a Domain Name System (DNS) 100 with an exemplary client 120 and an exemplary client-side load balancing method 170. The DNS 100 includes a network 105 (e.g., the Internet) and a DNS server 107 with a server-side load balancing module 142. The client 120 includes a DNS service 110, an associated cache 112 and a client-side load balancing module 140. In the example of FIG. 1, a domain name www.msn.com is hosted by a server farm associated with a virtual IP address (VIP: xxx.xxx.xxx.195). As shown in FIG. 1, some form of computing device or network device 109 receives network traffic for the VIP and is associated with blocks of servers (e.g., server blocks 1 through 3: SB1, SB2 and SB3). The device 109 also includes a load balancing module 144. Each block of servers has a range of real IP addresses and the whole farm has a compound range (e.g., the sum of the individual ranges). In the example of FIG. 1, the load balancing module 144 is responsible for communicating a range or ranges. Of course, any type of resource arrangement may exist behind a VIP, noting that some form of information must be capable of being communicated so as to allow for client-side selection to achieve load balancing.

According to the method 170, in a request block 172, a client (e.g., the client 120) requests resolution of a domain name. In a reception block 174, the client receives a VIP and range information from a DNS server (e.g., the DNS server 107). In a selection block 176, the client statistically selects a value in the range (e.g., selects an IP address in the range using the load balancing module 140). In a connection block 178, the client then connects to the server having the selected IP address where the server is "behind" the VIP (e.g., a server in SB1, SB2 or SB3).

Figure 2:
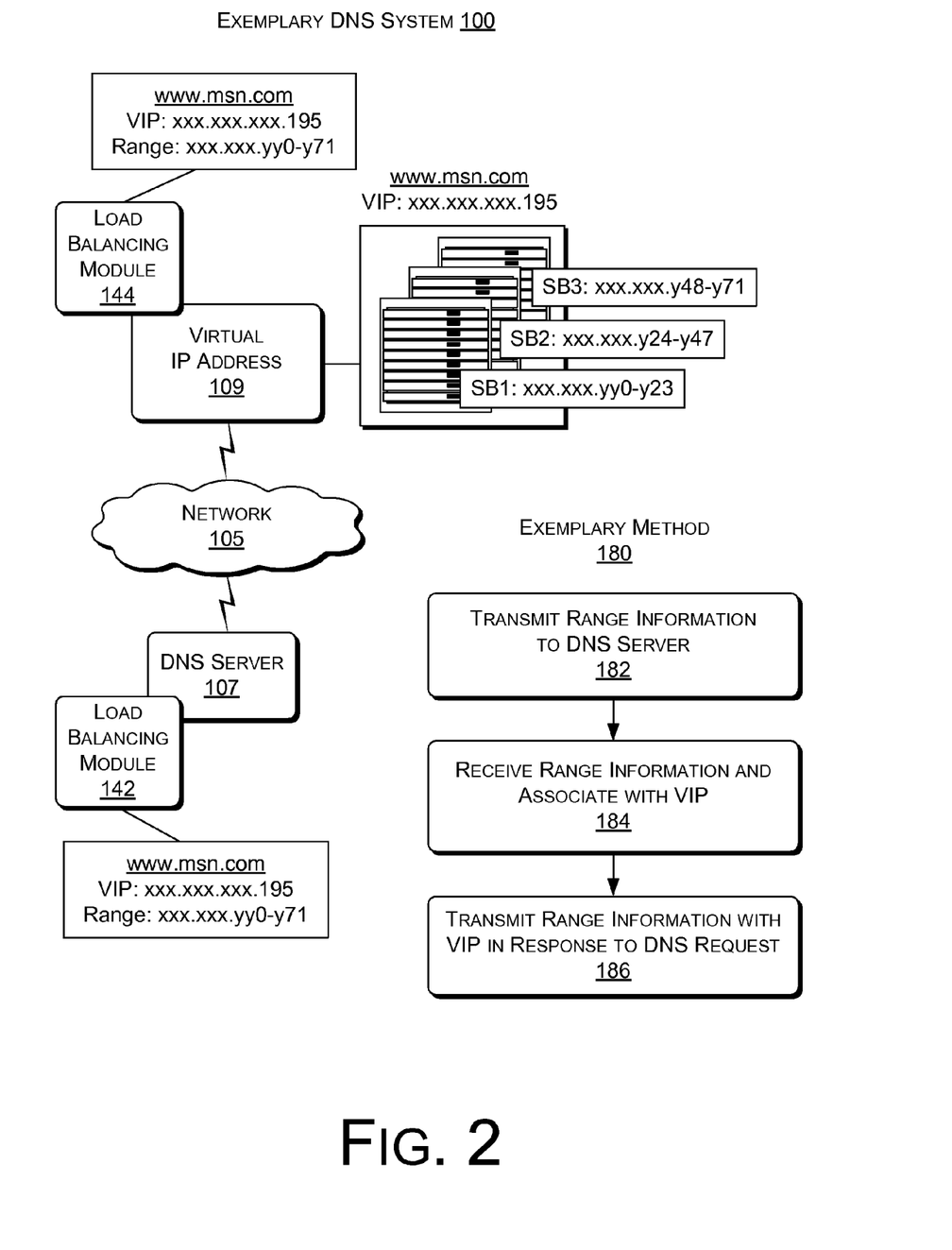
FIG. 2 is a diagram of an exemplary DNS system and method for communicating range information about a cluster associated with a virtual IP address to a DNS server.

FIG. 2 shows a portion of the exemplary DNS system 100 of FIG. 1 along with an exemplary method 180. In the method 180, a transmission block 182 transmits range information associated with a VIP (e.g., the VIP associated device 109). This information may be transmitted from the server farm or it may be transmitted from an administrator or administrative device associated with the server farm. In a reception block 184, a server (e.g., the DNS server 107) receives the transmitted range information. Per a transmission block 186, the server may transmit the range information with the VIP in response to a DNS name resolution request.

Figure 3:
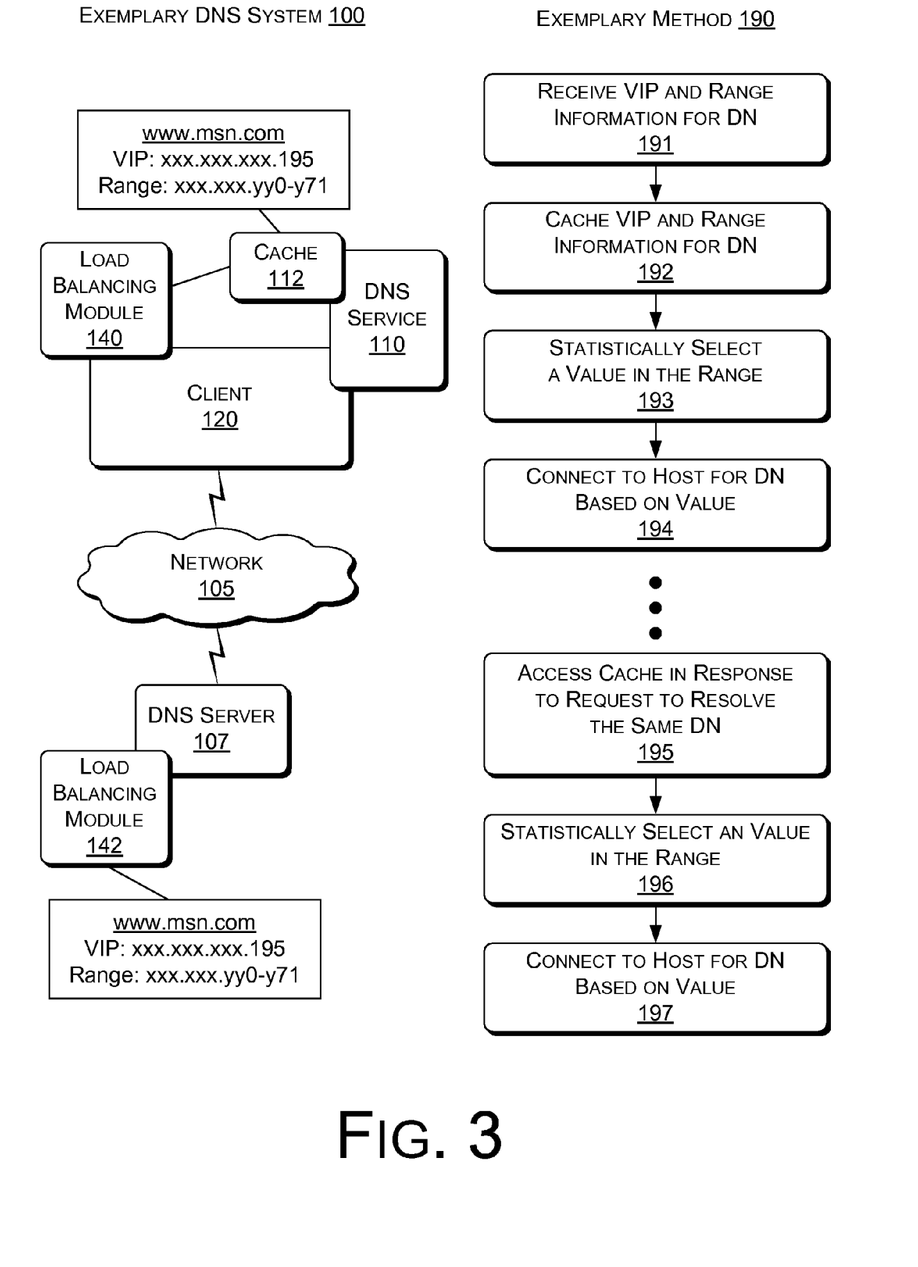
FIG. 3 is a diagram of an exemplary DNS system and method for communicating range information about a cluster associated with a virtual IP address from a DNS server to a client.

FIG. 3 shows a portion of the DNS system 100 of FIG. 1 along with an exemplary method 190. In a reception block 191, a client receives a VIP and associated range information for a domain name. In a cache block 192, the client caches the VIP and the range information for the domain name (e.g., in the cache 112). In a selection block 193, the client selects, using some statistical algorithm, a value in the range (e.g., using the load balancing module 140). Then, in a connection block 194, the client connects to a host for the domain name based at least in part on the selected value.

In the example of FIG. 3, the client may terminate the connection and at some time later, desire reconnection to a resource associated with the domain name. In an access block 195, the client accesses its cache (e.g., the cache 112) in response to a request for resolution of the same domain name. If the range information is still residing in the cache, in another selection block 196, the client selects, using some statistical algorithm, a value in the range (e.g., using the load balancing module 140). Then, in a connection block 197, the client connects to a host for the domain name based at least in part on the selected value, noting that the host may be different than the host of the connection block 194. In such a manner, a client can load balance continuously without necessarily having to resort to making external requests for name resolution that would increase network traffic. Alternatively, a client may cache or lock a selected value for a domain name and use this value for future sessions, unless the selected value is unavailable, in which case choosing a new value is desirable. One possible approach to selecting a value statistically yet at the same time selecting the same value as long as the same value is desired is to choose the element in the range by hashing some piece of client state that persists over some period of time, such as the client's MAC address.

An exemplary method for load balancing includes accessing a range of values for IP addresses associated with a virtual IP address associated with a domain name; selecting, using a local statistical algorithm, a value in the range; and, based at least in part on the selected value, connecting to a remote resource at one of the IP addresses. Referring to the DNS system 100 of FIG. 1, the client 120 can implement such a method to, for example, randomly select one of the servers behind the virtual IP address 109. The servers in one of the server blocks (SB1, SB2 or SB3) may be dedicated to particular web-based services. In such an arrangement, the servers within a particular block may be fungible and equally capable of performing a task or tasks for the client 120. The random selection process performed by the client 120 load balances requests directed to the resources associated with the range or range information. Specifically, where many clients have the capability to randomly select a resource behind a virtual IP address, load balancing is shifted away from the server group (e.g., server farm or cluster) and on to many clients. This effectively distributes the burden of load balancing from a task that is handled conventionally in a centralized manner to tasks that are handled in a distributed manner.

With respect to the actual selection to effectuate load balancing, this may occur in any of a variety of manners. For example, the client 120 may receive a range defined by a lower value and an upper value. In turn, an algorithm can select a value in the range. Alternatively, the client 120 may receive a value and a delta that define a range. In turn, an algorithm can select value in the range. At a minimum, the client 120 performs an act that directly or indirectly leads to selection of one of many fungible resources and where, collectively, many similarly configured clients effectuate load balancing for these fungible resources.

An exemplary method may include disconnecting from a remote resource and then repeating a statistically-based selection process to reconnect to a remote resource. A statistical algorithm can reside locally on a client computing device (e.g., in a library of algorithms that include functions such as a random function). A selection mechanism may be a local operating system service.

An exemplary method may include a time-to-live (TTL) for a range where, for example, upon expiration of the TTL, a request issues for a range of values associated with a virtual IP address.

An exemplary method includes connecting to a remote resource where the remote resource is a host server for a domain name. An exemplary method may, based at least in part on a statistically selected value, attempt to connect to a remote resource at one of many IP addresses specified by a range or range information (e.g., a value and a delta, etc.). Where such a method fails to connect, it may repeat a statistical selection process. A method may include deleting a previously selected value (i.e., a failed value) from a range prior to repeating a statistical selection process.

An exemplary method for load balancing includes accessing a range of values for IP addresses associated with a virtual IP address associated with a domain name; selecting, using a local statistical algorithm, a value in the range; and, upon failure to connect to a remote resource at the IP address associated with the selected value, repeating the selecting. Such a method may further include, after failing to connect to one or more IP addresses for a given virtual IP address associated with the domain name, accessing a range of values for IP addresses associated with a different virtual IP address associated with the same domain name; selecting, using a local statistical algorithm, a value in the range; and based on the selecting, attempting to connect to a remote resource at one of the IP addresses associated with the different virtual IP address.

As described herein, a client-side load balancing module for execution on a computing device (see, e.g., module 470 of FIG. 4) can include instructions to access range information in a resolver cache where the range information corresponds to IP addresses associated with a virtual IP address associated with a domain name and instructions to directly or indirectly select, using a local statistical algorithm, one of the IP addresses.

Figure 4:
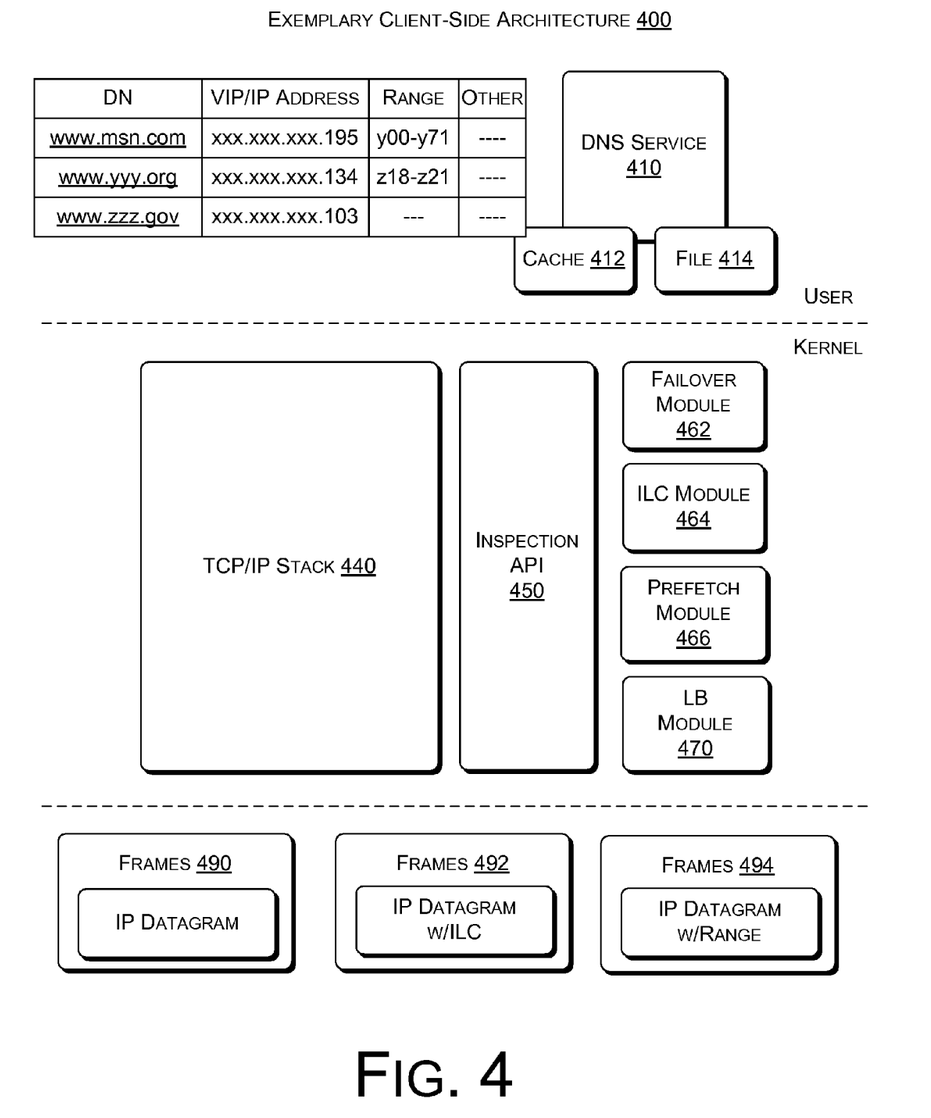
FIG. 4 is a diagram of an exemplary client-side architecture that includes a load balancing module.

FIG. 4 shows an exemplary client-side architecture 400 that includes a load balancing module 470 configured to perform various exemplary methods such as the method 190 of FIG. 3. The architecture 400 includes components in a user space and components in a kernel space. The user space includes can include applications, which may be stateless or stateful, application programming interfaces (APIs), and a DNS service 410 with an associated cache 412 and file 414 for storing information associated with domain names (e.g., IP addresses, TTL, etc). The DNS service 410 may be an OS service.

The kernel space includes various components that operate in conjunction with a TCP/IP stack 440. Such a stack typically operates via a network driver interface specification (NDIS) to communicate with network resources via frames 490, 492 and 494. The TCP/IP stack 440 includes a transport layer, a network layer and a framing layer. As shown, frame 490 carries an IP datagram, frame 492 carries an IP datagram and Internet Location Coordinate (ILC) information (see, e.g., FIGS. 5 and 6) and frame 494 carries an IP datagram and range information.

The architecture 400 may include the following APIs by which applications, services, or other system components access the TCP/IP stack 440:

A Kernel-Mode API used by KM clients.

Sockets API used by Sockets-based applications and services. The Sockets API operates through an Ancillary Function Driver (AFD) to perform Socket functions with the TCP/IP stack 440.

Transport Driver Interface (TDI) used by NetBIOS over TCP/IP (NetBT) clients and other legacy TDI clients. A translation layer exists between TDI and the TCP/IP stack 440.

The TCP/IP stack 440 exposes an inspection API 450, which provides a consistent, general-purpose interface to perform deep inspection or data modification of packet contents. The Inspection API 450 is part of a filtering platform. The TCP/IP stack 440 provides access to the packet processing path at the Network and Transport layers.

The architecture 400 includes an exemplary failover module 462, which may be configured in any of a variety of manners. For example, the failover module 462 may be configured to directly access information in the TCP/IP stack 440. The module 462 may be configured to use the inspection API 450. The failover module 462 may also be configured to expose an API for user space applications. The failover module 462 may be part of, or function cooperatively with, the DNS service 410. For example, the failover module 462 may be a separate OS service that can retrieve information from the resolver cache 412 or resolver file 414.

The architecture 400 also includes an ILC module 464, which provides for processing Internet Location Coordinate (ILC) information. Such information is described in more detail with respect to FIGS. 5 and 6. The ILC module 464 may be configured to operate in conjunction with the failover module 462. For example, failover may occur based at least in part on ILC information. The ILC module 464 may be part of, or function cooperatively with, the DNS service 410. For example, the ILC module 464 may store ILC information in a cache and/or a file associated with the DNS service 410.

The architecture 400 includes an exemplary prefetch module 466, which may be configured in any of a variety of manners. For example, the prefetch module 466 may be configured to directly access information in the TCP/IP stack 440. The module 466 may be configured to use the inspection API 450. The prefetch module 466 may also be configured to expose an API for user space applications. The prefetch module 466 may be part of, or function cooperatively with, the DNS service 410. For example, the prefetch module 466 may be a separate OS service that can retrieve information from the resolver cache 412 or resolver file 414. Alternatively, another cache or file may be available that maintains information between boots of a client computing device (i.e., a persistent information store). The module 466 may be configured to operate in conjunction with the failover module 462 and/or the ILC module 464. For example, the prefetch module 466 may fetch information for use by the failover module 462 and the prefetch module 466 may fetch information based at least in part on ILC information.

The architecture 400 includes an exemplary load balancing module 470, which may be configured in any of a variety of manners. For example, the load balancing module 470 may be configured to directly access information in the TCP/IP stack 440. The module 470 may be configured to use the inspection API 450. The prefetch module 470 may also be configured to expose an API for user space applications. The load balancing module 470 may be part of, or function cooperatively with, the DNS service 410. For example, the load balancing module 470 may be a separate OS service that can retrieve information from the resolver cache 412 or resolver file 414. Alternatively, another cache or file may be available that maintains information. The module 470 may be configured to operate in conjunction with the failover module 462, the ILC module 464 and/or the prefetch module 466. For example, the prefetch module 466 may fetch information for use by the load balancing module 470 and the load balancing module 470 may select a particular range as being associated with an optimal IP address (e.g., a VIP) based at least in part on ILC information.

Figure 5:
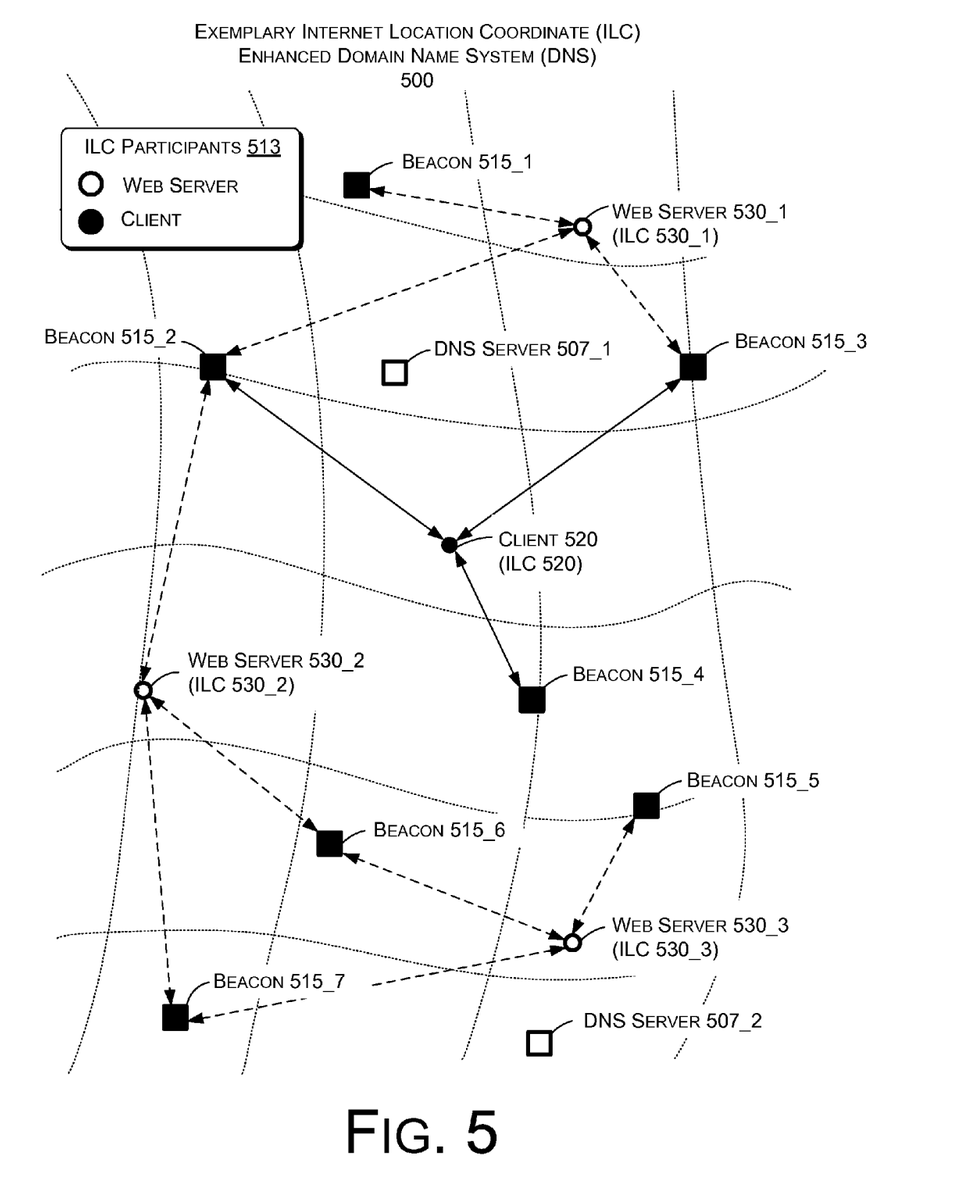
FIG. 5 is a diagram of an exemplary Internet Location Coordinate (ILC) enhanced Domain Name System (DNS)

FIG. 5 shows an exemplary Internet Location Coordinate (ILC) enhanced Domain Name System (DNS) 500. The system 500 includes DNS servers 507, beacons 515, a client 520 and web servers 530. Any resource on the Internet that can acquire an ILC may be deemed an ILC participant. For example, a box in FIG. 5 shows ILC participants 513 as including the client 520 and the web servers 530; thus, in this example, an ILC participant can be a client or a server. A participant can also be a device associated with a virtual IP address. For example, the web server 530_1 may be a device at a virtual IP address for receiving traffic for a server farm where servers in the server farm have real IP addresses "behind" the virtual IP address.

The system 500 may depend on time, distance, network traffic, machine workload, bandwidth, etc. To understand better how such a system may be defined, consider a vehicle on a major interstate highway en route to an airport. At various locations along the highway, the state department of transportation transmits information to displays that provide information to vehicle operators. When the vehicle is at a display location, the department of transportation may transmit a travel time message that indicates how many minutes it will take for a vehicle at the display location to reach the airport. Such information is helpful as the vehicle operator may decide to take an alternate route. Further, the reasons for the stated travel time may be irrelevant to the vehicle operator. In other words, the vehicle operator may not care whether the travel time is lengthy due to road construction, holiday traffic, an accident, etc. While the department of transportation may choose to display a specific reason or reasons, such information may not add much value to the information conveyed by a simple travel time in minutes.

As described herein, in various examples, an Internet Location Coordinate (ILC) may be a number, a set of numbers, or a set of numbers where each one is associated with some additional information (e.g., a tuple for each beacon). An ILC may indicate a local position to a client where this position is with respect to a network logical space measuring "travel time" or congestion, and not necessarily geographic location. ILCs may be compared to estimate "travel time" or congestion between participants. Such simplicity is in-line with the DNS and such an ILC may be carried according to an existing DNS protocol.

Referring again to the system 500 of FIG. 5, the client 520 acquires information associated with three beacons 515_2, 515_3 and 515_4. For example, a beacon can act as a reflector where the client 520 can send a packet to the beacon and receive a response packet. The client 520 can then determine the round trip time (RTT) to and from a beacon (e.g., a "travel time"). As the client 520 performs the same process with multiple beacons (i.e., the beacons 515_2, 515_3 and 515_4), the client 520 becomes more aware of its surroundings. In particular, the client 520 becomes aware of its own condition in the system where its own condition may be represented according to a number or a set of numbers, etc.

As mentioned, an ILC participant can be any resource on a network. Hence, the web servers 530_1, 530_2 and 530_3 may be participants that can determine respective ILCs using the beacons 515. For example, the web server 530_1 may transmit packets to the beacons 515_1, 515_2 and 515_3 and receive corresponding return packets. As the web server 530_1 may know, a priori, information about the beacons 515_1, 515_2 and 515_3, it can now determine its position in the system (e.g., its ILC). While the example of FIG. 5 shows three beacons, other numbers of beacons may be used. Generally, two or more beacons may be used.

As described herein, the exemplary system 500 allows clients to determine their position in a network logical space. Such information can be used for a variety of purposes. For example, where the web servers 530_1, 530_2 and 530_3 provide essentially identical services, such information can be used to allow the client 520 to connect to the "best" web server (e.g., the "closest" server based on ILCs).

Figure 6:
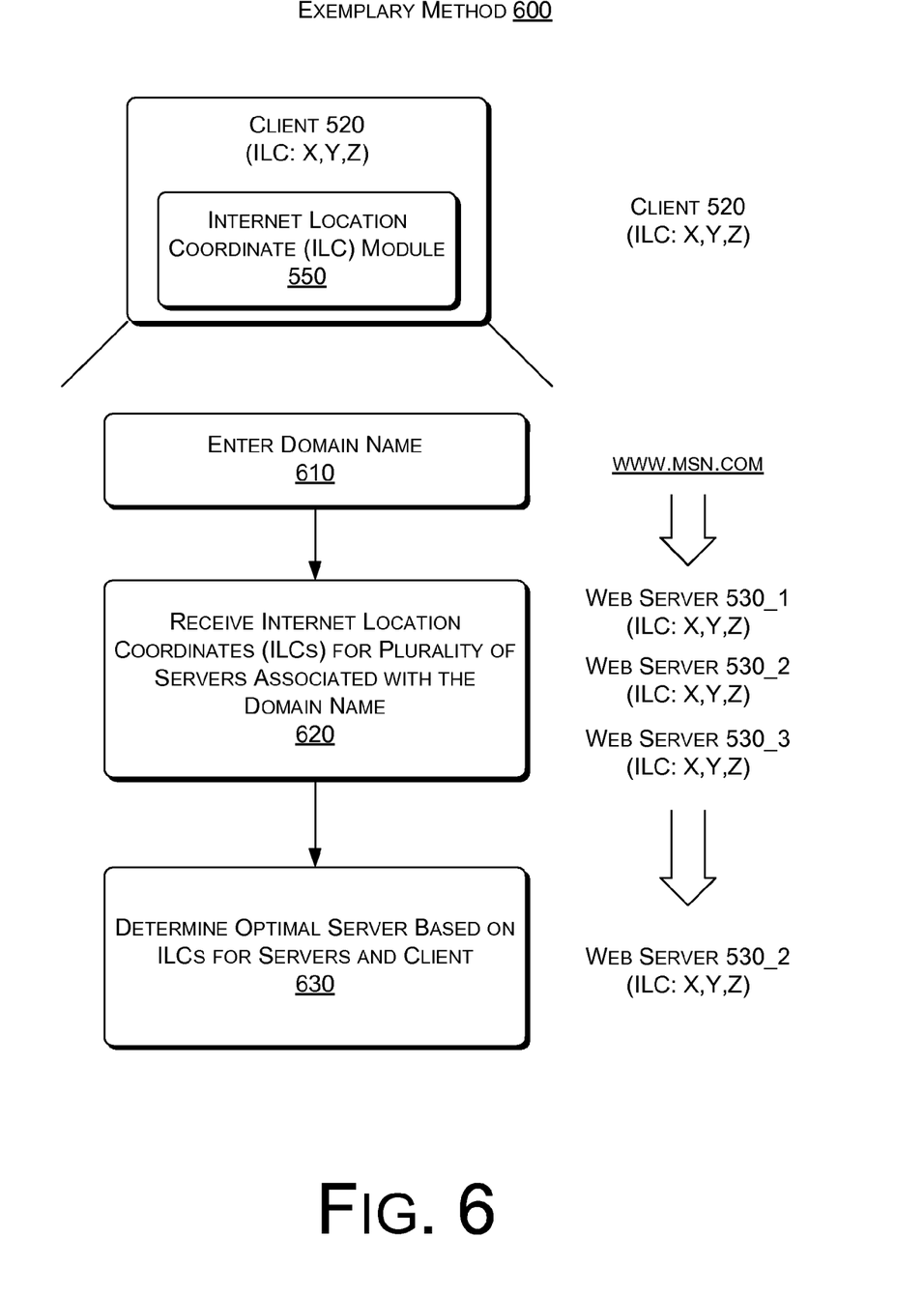
FIG. 6 is a diagram of an exemplary method for determining an optimal server for a group of servers for a domain name.

FIG. 6 shows an exemplary method 600 for determining an optimal server from a plurality of servers. In this example, the plurality of servers are participants in an ILC enhanced system. The method 600 may be implemented using a client 520 located on a network where the client 520 includes an ILC module 550; accordingly, the client 520 "knows" its ILC in the network space.

In an entry block 610, a domain name is entered (e.g., www.msn.com). In turn, a DNS server may identify a plurality of servers associated with the domain name, for example, web server 530_1, 530_2 and 530_3. As explained, each of the servers includes an ILC module to ascertain their respective ILCs. In a receipt block 620, the client 520 receives information about the group of servers along with the ILC for each of the servers in the group. In a determination block 630, the client 520 determines the optimal server based on the ILCs for the servers and its own ILC.

In the example of FIG. 6, the client 520 may be a user connected to the Internet and the domain name may be www.msn.com. This domain name has a plurality of associated servers at various geographical locations around the world. Given the exemplary architecture 500 where beacons 515 are scattered throughout the networked world, each of the servers for the www.msn.com domain name knows its own ILC. When the DNS communicates with each server, each server can respond by sending its ILC to the DNS server, which, in turn, transmits this information to the client 520. The ILC module 550 can then determine which server is the optimal server based on the client's 520 ILC and those of the servers. In general, the optimal server is the server that can provide the most efficient service to the client 520.

Figure 7:
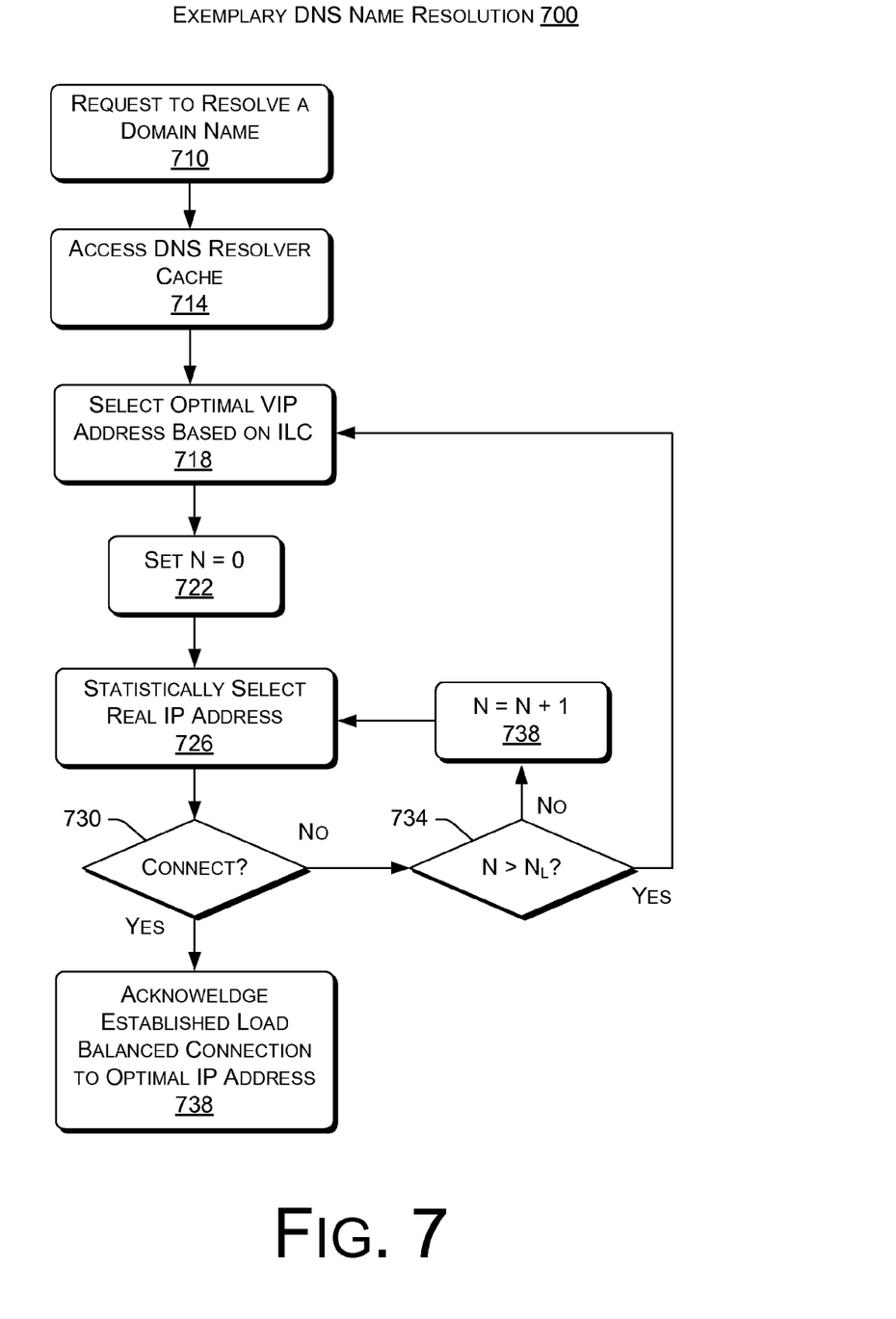
FIG. 7 is a diagram of an exemplary method for selecting an optimal virtual IP address and for client-side load balancing.

FIG. 7 is an exemplary method 700 for selection of an optimal VIP and client-side load balancing. In a request block 710, a request is made for resolution of a domain name. In an access block 714, a DNS resolver cache is accessed where the cache includes ILC information for multiple VIPs associated with the domain name. In a selection block 718, a selection is made for an optimal VIP based at least in part on the ILC information. A set block 722 then sets a counter "N" to zero or some other base value. A selection block 726 follows that uses a statistical algorithm (e.g., random function) to select a real IP address from range information associated with the optimal VIP. A decision block 730 follows where a decision is made as to whether a connection could be established to the real IP address associated with the optimal VIP. If the decision block 730 decides that a connection was successfully established, then per an acknowledgement block 738, it is acknowledged that a load balanced connection was established to an optimal IP address. However, if the decision block 730 decides that a connection could not be established, then another decision block 734 decides if the counter "N" is less than some counter limit (i.e., $N_L$, to limit the number of tries). For example, a limit may be set to limit the number of statistical selections to about three. The limit may depend on range information. If the decision block 734 decides that the limit is not exceeded, then an increment block 738 increments the counter "N" and proceeds to the selection block 726. Of course, other types of counters may be used (e.g., a decreasing counter). In addition, time restrictions may be used to restrict a time period for retrying.

Referring again to the decision block 734, if the limit is exceeded, the "yes" branch, then the method 700 continues at the selection block 718. As the VIP associated with the failure to connect is removed from the analysis, the analysis may simply resort to a remaining VIP or select an optimal VIP from a fewer number of VIPs based at least in part on ILC information. Further, if the initial analysis ranked the VIPs, then the selection may simply select the second best VIP. Similarly, in the loop of blocks 726, 730, 734 and 738, each time a statistically selected value (e.g., real IP address) fails to connect, this value may be eliminated from the possible values. Again, where the total number of values (e.g., the range) is small, the selection process may simply resort to a remaining value.

Figure 8:
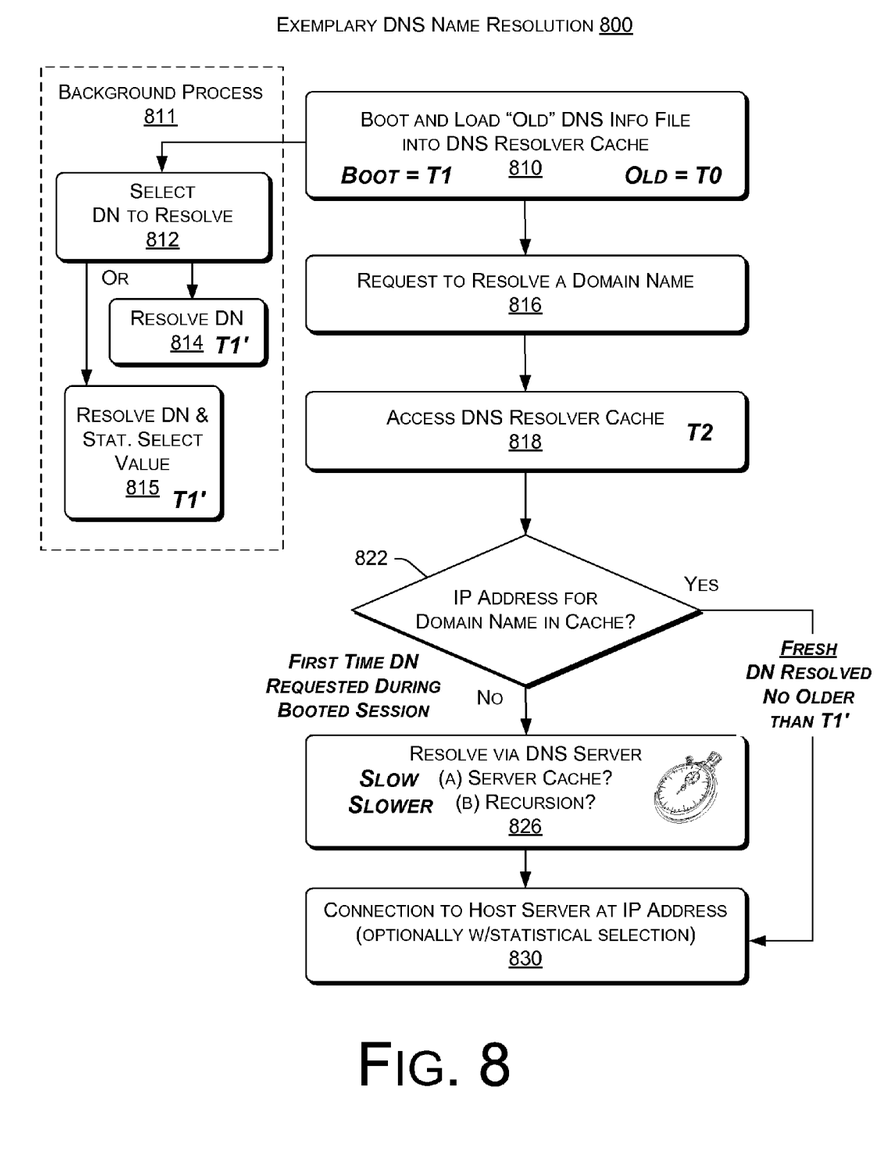
FIG. 8 is a diagram of an exemplary method for prefetching domain name information for one or more domain names and for client-side load balancing.

FIG. 8 shows an exemplary method 800 for DNS name resolution with client-side load balancing. The method 800 can enhance a user's experience by allowing for connections to be established more quickly in a load balanced manner. In particular, the method 800 can enhance a user's experience where the user wants to connect to resources associated with a domain name used previously (e.g., prior to log-in, booting, etc.).

According to the method 800, in a boot block 810, a client computing device ("client") starts-up and loads "old" DNS information from a file into the client's DNS resolver cache. In the boot block 810, the boot time is designated T1 and the age of the "old" DNS information is designated T0. In the example of FIG. 8, it is assumed that the file includes, at a minimum, one or more domain names. The file may optionally include other information such as range information. When the file is loaded, a background process 811 commences that includes a selection block 812 that selects a domain name to resolve. As shown, two options exist, resolution of the domain name per resolution block 814 or resolution followed by a selection per block 815. For example, where the client receives a VIP with range information, then the resolution process may proceed per the block 815. Alternatively, selection of a value in a range may occur at a later time.

In the example of FIG. 8, the domain name information acquired for a particular domain name by the background process 811 is assigned a time T1'. A conventional name resolution process includes issuing a request to a DNS server to, for example, acquire a Resource Record (RR) for a domain name. In turn, information received from the DNS server is loaded into the client's DNS resolver cache. The background process 811 may execute during empty or unused cycles during start-up of the client computing device. The background process 811 may execute during empty or unused cycles during start-up of the client computing device or at others times during the use of the computing device. The background process 811 may be limited in terms or execution time and the number of domain names to resolve or it may be limited to increase the total DNS traffic by no more than a constant factor over what the user's actions would have naturally incurred. For example, the process 811 may be restricted to the first five minutes after boot and/or be limited to about twenty domain names. While such a process may be customized by a user, it may be programmed by default to execute automatically without user input or user awareness. The prioritization of domain names to fetch may be based on prior history of domain name requests, likely prioritizing those prior name requests that would not be served from the local DNS resolve cache if they recurred.

At some time after boot, per a request block 816, the client requests resolution of a domain name. At a time T2, where T2 is greater than T1', the client accesses its DNS resolver cache. A decision block 822 follows that decides if an IP address exists in the resolver cache for the domain name. If the decision block 822 fails to find an IP address, then a resolution block 826 resolves the domain name via a DNS server. According to this branch, the domain name was not amongst the one or more domain names resolved by the background process 811. If the decision block 822 finds an IP address for the domain name in the client's DNS resolver cache, then it is a "fresh" IP address, possibly acquired at time T1'. In other words, if the domain name specified in the request block 816 is a domain name resolved by the background process 811, then the domain name information is no older than T1'.

Figure 9:
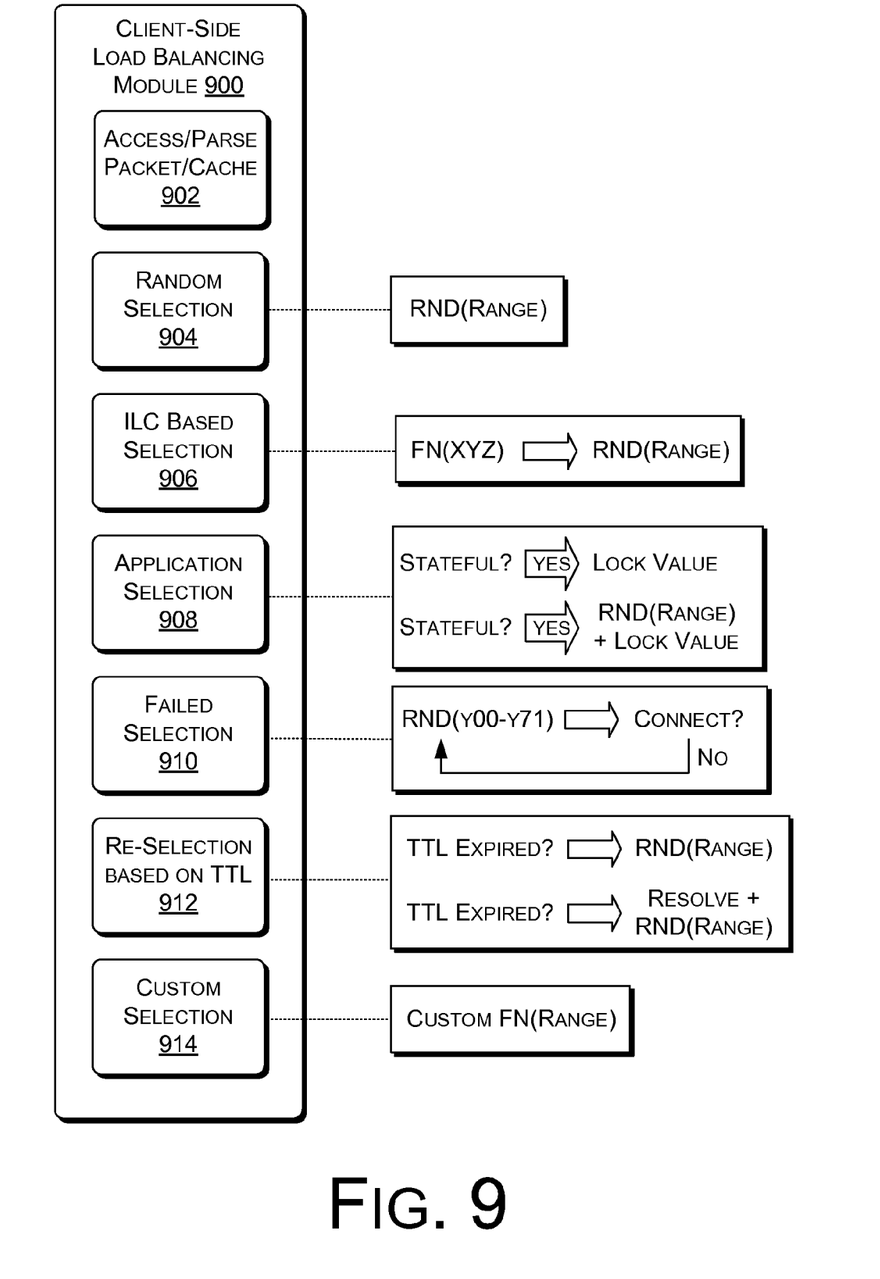
FIG. 9 is a diagram of an exemplary client-side load balancing module suitable for use in the client-side architecture of FIG. 4.

FIG. 9 shows an exemplary client-side load balancing module 900 that includes various components. An access and/or parsing component 902 can access and/or parse a packet received over a network and/or cached information. A selection component 904 can randomly select a value from a range. An ILC component 906 can select an optimal VIP and then call for a statistical selection of a value in a range of IP addresses behind the VIP. An application selection component 908 can allow a stateful application to lock a value in a range or select a value and then lock the value. For example, a stateful application may share information with a specific host server at a particular, selected IP address. A client may wish to lock or maintain the value for any of a variety of purposes. A failed selection component 910 may respond to a failure to connect by repeating a selection process and optionally removing a value associated with a failed connection from consideration in the repeated selection process. A re-selection based on TTL component 912 may call for selection of a value in a range with or without resolving a domain name by issuing an external request (e.g., to a DNS server). A custom selection component 914 may use a customized function to select a value based on range information associated with a VIP.

Figure 10:
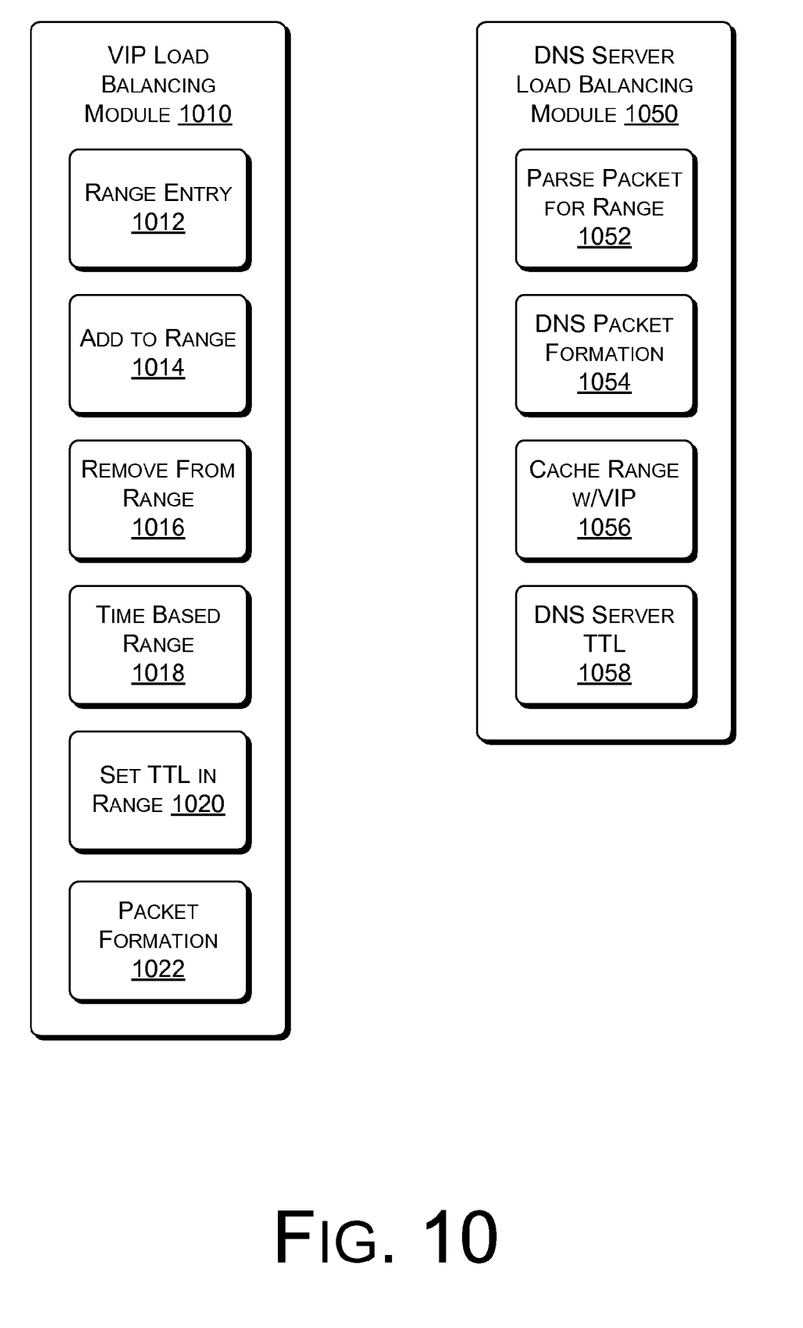
FIG. 10 is a diagram of an exemplary virtual IP load balancing module and an exemplary DNS server load balancing module.

FIG. 10 shows an exemplary VIP load balancing module 1010 and an exemplary DNS server load balancing module 1050. In the example of FIG. 10, the module 1010 includes a range entry component 1012 that allows for entry of range information (e.g., a range) for broadcast over a network in association with a virtual IP address. An addition component 1014 allows for adding one or more possible real IP addresses to a range. A removal component 1016 allows for removing one or more possible real IP addresses from a range. A time based range component 1018 allows for associating time information with range information or determining ranges based in part on time. For example, during certain times of the day, a cluster may broadcast a particular range and then at other times it may broadcast a different range (e.g., completely different or overlapping). A set TTL in range component 1020 allows for setting a TTL or TTLs for a range. A packet formation component 1022 allows for creating a packet that includes range information.

The DNS server load balancing module 1050 includes a parse packet for range component 1052. This component allows a DNS server to parse a packet and extract or repacketize (repackage) range information. A DNS packet formation component 1054 allows a DNS server to form DNS packets with range information. A cache range with VIP component 1056 allows a DNS server to cache locally at the DNS server a VIP in conjunction with range information. A DNS server TTL component 1058 allows a DNS server to associate a TTL with a VIP or specifically with range information associated with a VIP. Such a component can allow the DNS server to simply request updated range information associated with a VIP.

Figure 11:
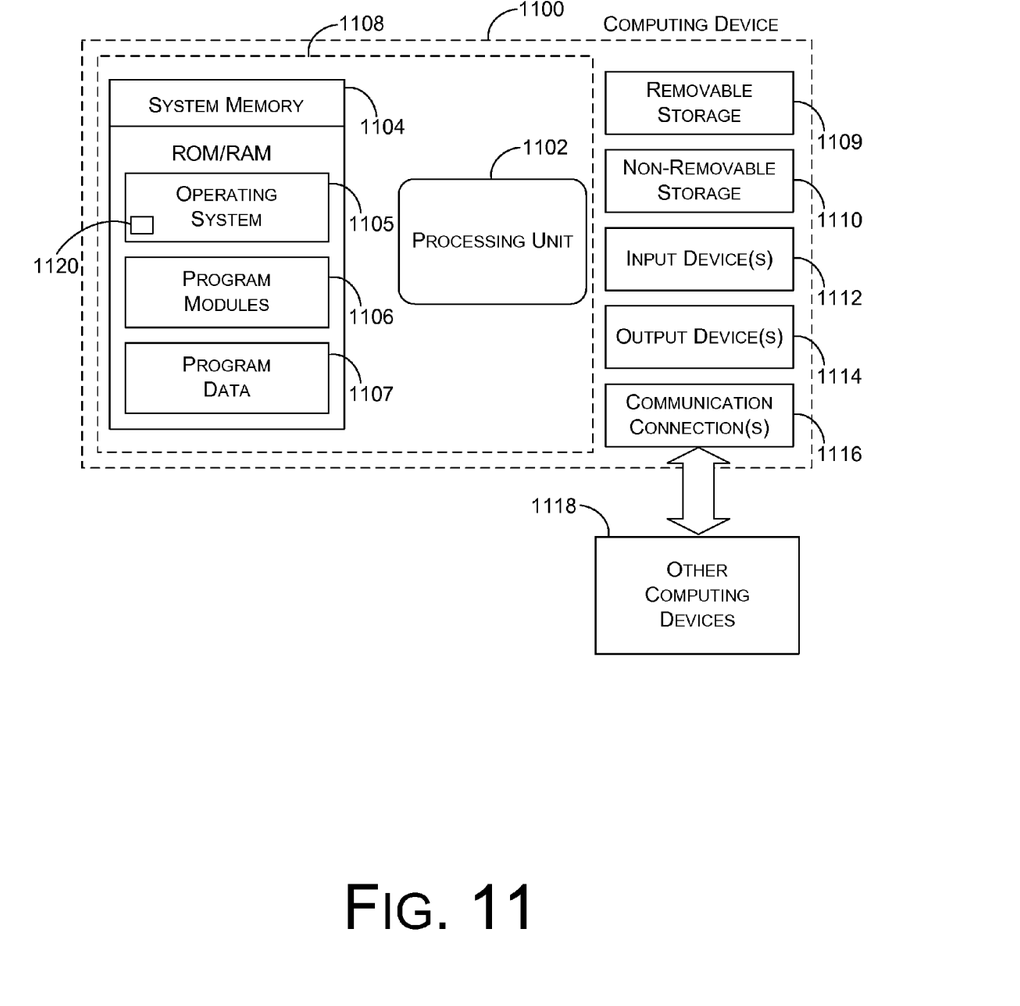
FIG. 11 is a diagram of an exemplary computing device.

FIG. 11 illustrates an exemplary computing device 1100 that may be used to implement various exemplary components and in forming an exemplary system. For example, the clients 520 or the servers 530 of the system of FIG. 5 may include various features of the device 1100.

In a very basic configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination of the two. System memory 1104 typically includes an operating system 1105, one or more program modules 1106, and may include program data 1107. The operating system 1105 include a component-based framework 1120 that supports components (including properties and events), objects, inheritance, polymorphism, reflection, and provides an object-oriented component-based application programming interface (API), such as that of the .NET™ Framework marketed by Microsoft Corporation, Redmond, Wash. The device 1100 is of a very basic configuration demarcated by a dashed line 1108. Again, a terminal may have fewer components but will interact with a computing device that may have such a basic configuration.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of device 1100. Computing device 1100 may also have input device(s) 1112 such as keyboard, mouse, pen, voice input device, touch input device, etc. Output device(s) 1114 such as a display, speakers, printer, etc. may also be included. These devices are well known in the art and need not be discussed at length here.

Computing device 1100 may also contain communication connections 1116 that allow the device to communicate with other computing devices 1118, such as over a network. Communication connections 1116 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for load balancing, implemented by a client computing device, the method comprising:
   determining a virtual IP (VIP) address associated with a domain name based on an Internet Location Coordinate (ILC) of the VIP address;
   accessing a range of values for IP addresses associated with the VIP address;
   selecting, using a local statistical algorithm, a value in the range, wherein the local statistical algorithm resides locally on the client computing device; and
   based at least in part on the selected value, connecting to a remote resource at one of the IP addresses.

2. The method of claim 1 wherein the accessing comprises receiving the range of values in response to a request for resolution of the domain name.

3. The method of claim 2 wherein the receiving comprises receiving the range of values from a Domain Name System server (DNS server).

4. The method of claim 1 wherein the accessing comprises accessing a Domain Name System (DNS) resolver cache.

5. The method of claim 1 wherein the statistical algorithm achieves load balancing for resources associated with the virtual IP address.

6. The method of claim 1 wherein the statistical algorithm comprises a random function.

7. The method of claim 1 wherein the selecting comprises randomly selecting a value in the range.

8. The method of claim 1 further comprising disconnecting from the remote resource and then repeating the accessing and selecting to reconnect to a remote resource at one of the IP addresses.

9. The method of claim 1 wherein the range comprises a lower value and an upper value.

10. The method of claim 1 wherein the range comprises a value and a delta that define the range.

11. The method of claim 1 further comprising a time-to-live (TTL) for the range.

12. The method of claim 11 wherein, upon expiration of the TTL, a request issues for a range of values associated with the virtual IP address.

13. The method of claim 1 wherein the remote resource comprises a host server for the domain name.

14. The method of claim 1 wherein the selecting comprises using a local operating system service.

15. The method of claim 1, wherein the range comprising contiguous IP address values between a lower value and an upper value, the range of values represented in a single IP address format having the lower value with the upper value being appended to the single IP address format.

16. A method for load balancing, implemented at least in part by a client computing device, the method comprising:
    accessing a range of values for IP addresses associated with a virtual IP address associated with a domain name, the virtual IP address being further associated with an Internet Location Coordinate and the range of values representing the IP addresses in a condensed format;
    selecting, using a local statistical algorithm, a value in the range, wherein the local statistical algorithm resides locally on the client computing device; and
    upon failure to connect to a remote resource at the IP address associated with the selected value, repeating the selecting.

17. The method of claim 16 further comprising:
    after failing to connect to one or more IP addresses for a given virtual IP address associated with the domain name, accessing a range of values for IP addresses associated with a different virtual IP address associated with the same domain name;
    selecting, using a local statistical algorithm, a value in the range; and
    based on the selecting, attempting to connect to a remote resource at one of the IP addresses associated with the different virtual IP address.

18. The method of claim 16 further comprising deleting the selected value from the range prior to repeating the selecting.

19. The method of claim 16 further comprising, prior to accessing, selecting a virtual IP address, associated with a domain name, based at least in part on Internet Location Coordinate information.

20. A client-side load balancing module for execution on a hardware client computing device, the module comprising:
    instructions for determining Internet Location Coordinate (ILC) information for the client computing device, the determining being based on communication with one or more network beacons by the client computing device;
    instructions for accessing Internet Location Coordinate (ILC) information for multiple Virtual Internet Protocol (VIP) addresses in a resolver cache;
    instructions for comparing the ILC information for the client computing device with the ILC information for the multiple VIP addresses;
    instructions for selecting an optimal VIP address associated with a domain name based on the comparing;
    instructions to access range information in the resolver cache, the range information corresponding to IP addresses associated with the optimal virtual IP address; and
    instructions to directly or indirectly select, using a local statistical algorithm, one of the IP addresses, the local statistical algorithm residing locally on the client computing device.

* * * * *